United States Patent [19]
Shoemaker

[11] Patent Number: 5,883,441
[45] Date of Patent: Mar. 16, 1999

[54] SEAT AND SEAT BELT SEQUENCE CIRCUIT

[75] Inventor: Jim Milton Shoemaker, Horicon, Wis.

[73] Assignee: Deere & Company, Moline, Ill.

[21] Appl. No.: 879,725

[22] Filed: Jun. 20, 1997

[51] Int. Cl.[6] ...................................... B60L 1/00
[52] U.S. Cl. ...................................... 307/10.1; 340/457.1
[58] Field of Search .................................. 307/9.1, 10.1, 307/10.6, 10.7; 280/728.1, 801.1, 862, 805, 808, 748; 180/270, 271, 272, 273, 286, 289; 701/1, 36, 45, 46, 47; 340/667, 438, 457, 457.1; 200/61.58 B

[56] References Cited

U.S. PATENT DOCUMENTS

| | | | |
|---|---|---|---|
| 3,748,639 | 7/1973 | Dobedoe et al. | 340/457.1 |
| 3,777,180 | 12/1973 | Carlson | 340/457.1 |
| 3,860,904 | 1/1975 | Andersen | 340/457.1 |
| 3,876,974 | 4/1975 | Yustick | 340/457.1 |
| 3,895,346 | 7/1975 | Assfour et al. | 340/457.1 |
| 3,906,441 | 9/1975 | Andersen et al. | 340/457.1 |
| 4,096,468 | 6/1978 | Kopera, Jr. | 340/457.1 |
| 4,844,196 | 7/1989 | Clevenger et al. | 180/273 |
| 4,885,566 | 12/1989 | Aoki et al. | 340/457.1 |
| 5,547,039 | 8/1996 | Berger et al. | 180/287 |

*Primary Examiner*—Richard T. Elms

[57] ABSTRACT

A simple discrete component logic circuit with transistors selectively connected through seat and belt switches to the battery. The transistors operate in either an off mode or a current saturation mode. The circuit includes a plurality of identical resistors and transistors for ease of assembly and reduced cost and can operate over a wide range of voltages without need for power regulation or filters. The circuit recognizes the proper logic sequence with the key switch in either the on or off position but an improper sequence warning signal is provided only after the key switch is turned on. The circuit prevents intermittent warnings or interruptions caused by the operator temporarily bouncing from the seat, but the proper sequence of operations must be preformed and the switches must be operational to prevent a warning signal.

15 Claims, 1 Drawing Sheet

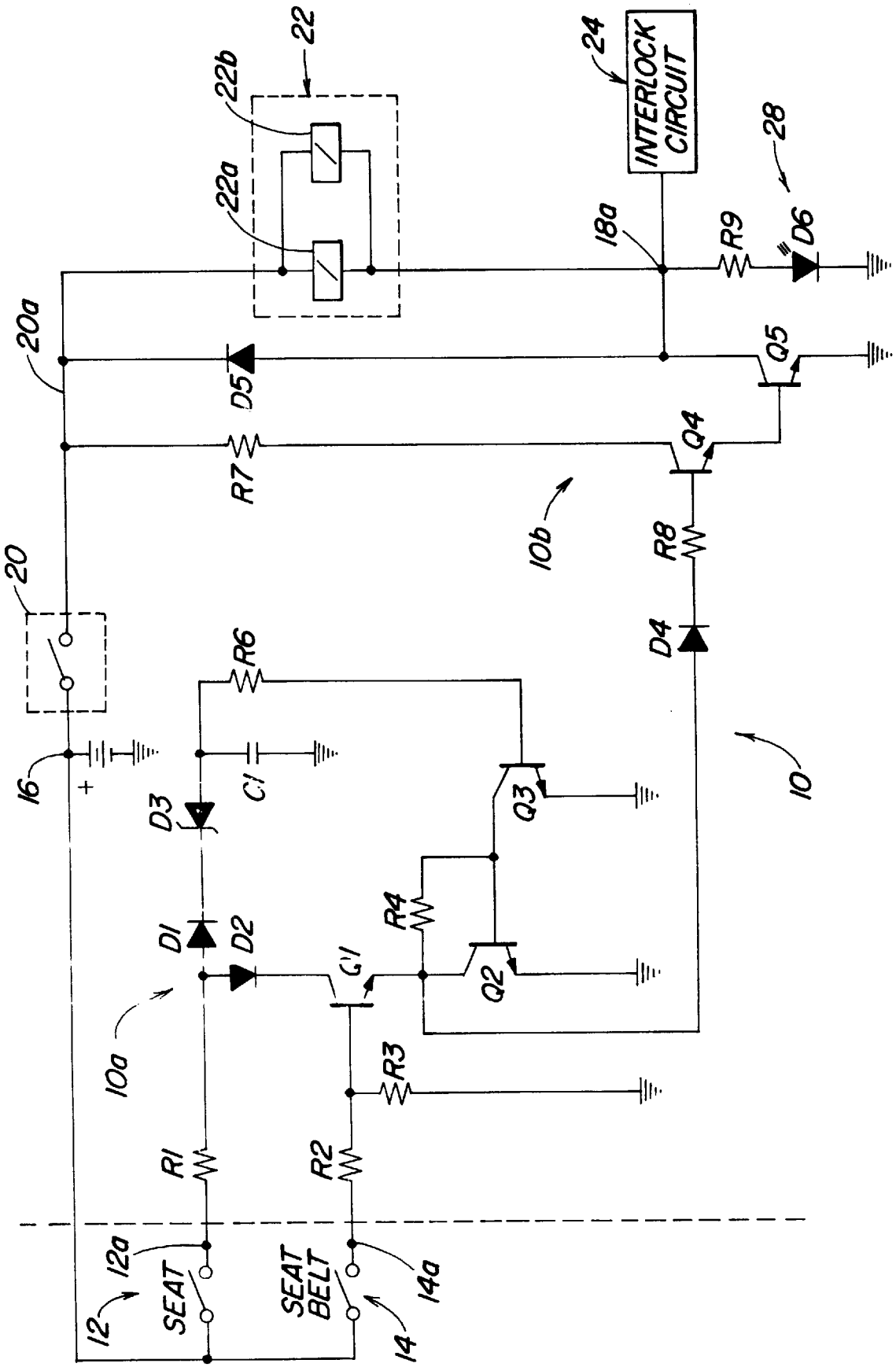

SEAT AND SEAT BELT SEQUENCE CIRCUIT

BACKGROUND OF THE INVENTION

1) Field of the Invention

The present invention relates generally to a seat belt system for a utility vehicle, and, more specifically, to a simplified circuit for verifying that a vehicle operator observes the proper sequence of positioning on the seat and seat belt fastening.

2) Related Art

In vehicles such as skid steer loaders and similar utility vehicles, there is a need to provide a seat belt system that verifies that the operator follows the proper procedure at the operator station which includes first sitting in the vehicle seat and then fastening the safety belt to assure that the operator cannot merely sit on a fastened belt. Further, the seat belt system must have the capability to prevent resetting of logic circuitry if the operator momentarily bounces out of the seat. Circuits including microcontrollers may be used for such seat belt systems, but the microcontroller requires filtered and reduced regulated voltage rather than direct battery voltage, which adds complexity and cost to the system. A circuit in a utility vehicle often must be able to operate over voltage extremes which can vary from a minimum of several volts to jump start voltages several times the minimum.

Another problem associated with belt and seat sequence circuits is assuring recognition of the proper order of events before or after the key switch is turned to the on position without causing significant current drain when the switch is off. If a warning signal such as a panel light can be lit with the switch off, the battery can be inadvertently discharged.

BRIEF SUMMARY OF THE INVENTION

It is therefore an object of the present invention to provide an improved seat belt sequence circuit. It is still another object to provide such a circuit which overcomes most or all of the aforementioned problems.

It is a further object of the present invention to provide an improved seat belt sequence circuit that assures that the operator cannot merely sit on a fastened seat belt. It is a further object to provide such a circuit that accommodates some operator bounce from the seat without resetting logic circuitry.

It is still another object of the present invention to provide an improved seat belt sequence circuit that does not require a microcontroller and which is simple and inexpensive in construction.

It is a further object to provide an improved seat belt sequence circuit that is particularly useful in utility vehicles and is able to operate effectively over a wide range of voltages. It is yet another object to provide such a circuit which is very simple and rugged and which obviates complex and costly filters and voltage regulators. It is a further object to provide such a circuit which does not require a relay.

It is yet a further object to provide an improved sequence circuit for a utility vehicle that recognizes a proper logic sequence with or without the key switch being turned on. It is another object to provide such a circuit which eliminates battery drain when the key switch is in the off position. It is still another object to provide such a circuit wherein an improper sequence warning signal is provided only after the key switch is turned on.

A seat belt sequence circuit constructed in accordance with the teachings of the present invention includes simple discrete component logic circuitry with transistors selectively connected through seat and belt switches to the vehicle battery. The transistors operate in either an off mode or a current saturation mode, and supply voltages can vary from a extremely low voltage under low battery conditions, such as when the vehicle is started in cold temperatures, to the relatively high voltages such as are often are encountered when a vehicle is jump started. To further increase ease of assembly and simplicity, the circuit includes many identical resistors and transistors. Complex microcontroller based logic, and voltage regulators and filters are eliminated to reduce costs and increase reliability in the hostile environment often encountered by a utility vehicle. The system can be built without relays, and the cost of such a system is only a fraction of that of some other systems.

The circuit recognizes the proper logic sequence with the key switch in either the on or off position, but an improper sequence warning signal is provided only after the key switch is turned on. Battery drain is virtually eliminated when the key switch is in the off position. The circuit prevents intermittent interruptions caused by the operator temporarily bouncing from the seat, but the proper sequence of operations must be preformed to prevent the warning signal. If the seatbelt switch fails open or is left open, the circuit logic is not satisfied. If the seatbelt switch fails closed, the logic is not satisfied. If the seat switch fails closed, the logic still requires the use of the seatbelt.

These and other objects, features and advantages of the present invention will become apparent to one skilled in the art upon reading the following detailed description in view of the drawings.

BRIEF DESCRIPTION OF THE DRAWINGS

The single drawing figure is a schematic of a seat and belt logic circuit.

DETAILED DESCRIPTION OF THE DRAWINGS

Referring now to the drawing, therein is shown a seat and belt logic circuit 10 having inputs 12a and 14a connected to a seat switch 12 and a seat belt switch 14, respectively, of a utility vehicle such as a skid steer loader (not shown) having an unswitched source of battery voltage indicated generally at 16 which typically can vary over a wide range of voltage levels. The circuit 10 includes an output terminal 18a connected via a key switch 20 to a switched power supply line 20a through control elements 22a and 22b of a vehicle attachment circuit 22 on the vehicle. The terminal 18a is also connected to a further interlock circuit 24 on the vehicle responsive to the signal at the terminal 18a to inhibit preselected vehicle operation should a given sequence of events on the vehicle, including seat switch 12 and seat belt switch 14 operation, fail to occur. A signal device 28 is also connected to the terminal 18a to provide a perceptible warning when an improper seat switch 12 and seat belt switch 14 sequence is detected by the circuit 10.

The circuit 10 includes a first discrete transistor circuit 10a having inputs connected through first leads of resistors R1 and R2 to the respective terminals 12a and 14a so that power to the circuit 10a is derived solely from the unswitched source 16 via closed seat switch 12 and/or closed seat belt switch 14. The opposite lead of resistor R1 is connected to the input terminals of diodes D1 and D2, and the diode D1 is connected to a zener diode D3. The diode D2 is connected to the collector of an n-p-n transistor Q1 having a base connected to a divider circuit including the resistor R2 and to a resistor R3 connected to ground. The emitter of the transistor Q1 is connected to the collector of a second transistor Q2 having a grounded emitter. A feedback resistor R4 is connected between the base and the emitter of the transistor Q2 and to the collector of a third transistor Q3 having a grounded emitter and a base connected through a resistor R6 to a timing capacitor C1. The timing capacitor C1 is connected through the diodes D1 and D3 to the resistor R1 and to the diode D2.

The circuit 10 also includes a second discrete transistor circuit 10b having an input transistor Q4 with a base connected via resistor R8 and diode D4 to the emitter of the transistor Q1. The collector of the transistor Q4 is connected through a resistor R7 to the unswitched source of voltage 16. The emitter of the transistor Q4 is connected to the base of a grounded emitter transistor Q5 having a collector connected to the output terminal 18a. The terminal 18a is also connected through a spike-eliminating diode D5 back to the unswitched source 16. The signal device 28 includes a light emitting diode D6 connected in series with a current limiting resistor R9 between the terminal 18a and ground.

In normal operation, the operator takes a position on the vehicle seat to close that seat switch 12 and provide a closed current path to charge the capacitor C1 via resistor R1 and diodes D1 and D3. The voltage on C1 increases to a level whereat the transistor Q3 is turned on to keep the base of the transistor Q2 below the turn-on voltage so that Q2 remains off. Thereafter, the seat belt is fastened around the operator to close the seat belt switch 14 and turn on the transistor Q1. Since the transistor Q2 is held in the off condition by the transistor Q3 in the on condition, current is fed from the seat switch 12 through the diode D2 and transistor Q1 to the input of the circuit 10b via diode D4 and the resistor R8 to turn on the cascaded transistors Q4 and Q5 and enable the output 18a by essentially grounding the terminal through the transistor Q5. The capacitor C1 provides a time delay so that any momentary opening of the seat switch 12, for example, that caused by operator bounce on the seat, does not switch the transistor Q3 from the on to the off condition.

If the seat belt is fastened first or left fastened, the seat belt switch 14 is closed so that Q1 and Q2 are turned on to prevent capacitor C1 from charging; therefore the transistor Q3 cannot turn on and the transistor Q2 remains on as turn-on current is fed to the base of the transistor Q2 through the resistor R4. If the seat switch 12 is closed after seat belt switch 14 is closed, the current through the resistor R1 is diverted through the diode D2 and transistors Q1 and Q2 so that the voltage at C1 fails to build up to turn on the transistor Q3 and satisfy the proper sequence logic of seat switch closure followed by seat belt switch closure. The output of the circuit 10a remains low so that the cascaded transistors Q4 and Q5 of the circuit 10b remain off and the output terminal 18a is at the high level. The interlock circuit 24 is responsive to a high signal at 18a to selectively prevent operation of preselected systems on the vehicle until the proper sequence is observed and the transistors Q4 and Q5 turn on to ground the terminal 18a. When the switch 20 is closed and the terminal is at the low output level indicating an improper sequence, a visual non-sequence warning is provided by the LED D6 as current flows through it from the switch 20, the circuit 22 and the resistor R9. The control elements 22a and 22b are disabled to prevent operation of the vehicle attachments associated with the circuit 22 until the proper sequence is observed and the terminal 18a is grounded by an enabling signal from the circuit 10a via diode D4 and resistor R8. If the seat belt switch 14 fails in the closed mode or is left closed by buckling the seat belt without the operator on the seat, or if the switch 14 fails open, the sequence logic is not satisfied. If the seat switch 12 fails closed, the logic still requires use of the seat belt to enable operation.

The discrete transistor circuits 10a and 10b operate either in a fully on current saturated mode to increase immunity to high voltage swings, or in a fully off condition to reduce current drain. An improper logic sequence is detectable even when the switch 20 (preferably a portion of the main vehicle ignition switch) is off, but the activation of the signal device is delayed until the ignition switch is turned on to reduce current drain.

By way of example only, the following component values have been found to provide good circuit operation for a nominal twelve volt vehicle system over a range of voltages from a low range during cold start conditions and a high jump start range:

R1, R2, R3 and R9 . . . 1 k ohms

R4 and R8 . . . 4.7 k ohms

R6 . . . 33 k ohms

R7 . . . 680 ohms

D3 . . . 3.3 volt zener

C1 . . . 4.7 uf

Having described the preferred embodiment, it will become apparent that various modifications can be made without departing from the scope of the invention as defined in the accompanying claims.

I claim:

1. A seat and seat belt logic circuit for a utility vehicle having a battery with a variable voltage level battery output, an operator seat, an operator latchable and unlatchable seat belt, and a switched source of battery voltage having on and off conditions, the circuit comprising:

a seat switch responsive to an operator positioned on the seat to provide a seat switch signal;

a belt switch responsive to latching of the seat belt to provide a belt signal;

wherein the seat switch and the belt switch include input terminals connected to the battery, and switched output terminals;

a first transistor circuit connected to the switched output terminals and responsive to the seat belt signal and the seat switch operation signal;

a second transistor circuit connected to the first transistor circuit and including an output terminal;

an improper sequence warning device connected to the output terminal for providing an indication of improper sequence of seat switch and seat belt switch operation; and wherein the first transistor circuit has an on condition and an off condition and includes a transistor operating in either a current saturated condition or an off condition to thereby limit current drain when off and provide immunity to large voltage variations in the battery output.

2. The circuit as set forth in claim 1 wherein the first transistor circuit includes a first circuit output connected to the second transistor circuit and providing a sequence indication to the second transistor circuit independently of the condition of the switched source of battery voltage.

3. The circuit as set forth in claim 1 wherein the warning device is connected to the switched source of battery voltage so that the indication of improper sequence of seat switch and seat belt switch operation is provided only when the switched source of battery voltage is in the on condition.

4. The circuit as set forth in claim 3 wherein the warning device is connected in series with a control element on the vehicle between the switched source of battery voltage and ground.

5. The circuit as set forth in claim 3 wherein the first transistor circuit is connected to the battery output through the seat and seat belt switches.

6. The circuit as set forth in claim 1 wherein the second transistor circuit has an on condition and an off condition and includes a transistor operating in either a current saturated condition or an off condition to thereby limit current drain when off and provide immunity to large voltage variations in the switched source of battery voltage.

7. The circuit as set forth in claim 3 wherein the second transistor circuit is connected to the switched source of battery voltage so the second transistor circuit is in an off state when the switched source of battery voltage is in the off condition.

8. The circuit as set forth in claim 3 wherein the switched source of battery voltage comprises the output terminal of a portion of an ignition switch having an input terminal connected to the vehicle battery and having an on condition and an off condition, whereby an improper sequence indication is provided only if the ignition switch is in the on condition.

9. The circuit as set forth in claim 8 wherein the first transistor circuit provides and maintains a sequence logic signal to the second transistor circuit, even when the ignition switch is in the off condition.

10. The circuit as set forth in claim 1 wherein the second transistor circuit includes a control transistor operable in a grounding mode to effectively ground the output terminal.

11. A seat and seat belt logic circuit for a utility vehicle having a battery with a variable voltage level battery output, an operator seat, an operator latchable and unlatchable seat belt, and a switched source of battery voltage having on and off conditions, the circuit comprising:

a seat switch responsive to an operator positioned on the seat to provide a seat switch signal;

a belt switch responsive to latching of the seat belt to provide a belt signal;

wherein the seat switch and the belt switch include input terminals connected to the battery, and switched output terminals;

a first transistor circuit connected to the switched output terminals and responsive to the seat belt signal and the seat switch signal;

a second transistor circuit connected to the first transistor circuit and including an output terminal;

an improper sequence warning device connected to the output terminal for providing an indication of improper sequence of seat switch and seat belt switch operation;

wherein the warning device is connected to the switched source of battery voltage so that the indication of improper sequence of seat switch and seat belt switch operation is provided only when the switched source of battery voltage is in the on condition;

wherein the second transistor circuit is connected to the switched source of battery voltage so the second transistor circuit is in an off state when the switched source of battery voltage is in the off condition; and wherein the first transistor circuit is connected to the battery output solely through the seat and seat belt switches, wherein the first transistor circuit provides and maintains a sequence logic signal to the second transistor circuit, even when the switched source of battery voltage is the off condition.

12. The circuit as set forth in claim 11 wherein the first and second transistor circuits include transistors that are in either a current saturated mode or in an off condition when the switched source of battery voltage is in the on condition.

13. A seat and seat belt logic circuit for a utility vehicle having a battery with a variable voltage level, an operator seat, an operator latchable and unlatchable seat belt, and a switched source of battery voltage having on and off conditions, the circuit comprising:

seat switch responsive to an operator positioned on the seat to provide a seat switch signal;

a belt switch responsive to latching of the seat belt to provide a belt signal;

wherein the seat switch and the belt switch include input terminals connected to the battery, and switched output terminals;

a first transistor circuit connected to the switched output terminals and responsive to the seat belt signal and the seat switch signal;

a second transistor circuit connected to the first transistor circuit and including an output terminal;

an improper sequence warning device connected to the output terminal for providing an indication of improper sequence of seat switch and seat belt switch operation; and wherein the first transistor circuit includes an R-C time delay circuit connected to the seat switch via a zener diode for preventing an improper sequence logic signal resulting from momentary opening of the seat switch.

14. A seat and seat belt logic circuit for a utility vehicle having a battery, an operator seat, an operator latchable and unlatchable seat belt, an unswitched source of battery voltage, and a switched source of battery voltage having on and off conditions, the circuit comprising:

a seat switch responsive to an operator positioned on the seat to provide a seat switch signal;

a belt switch responsive to latching of the seat belt to provide a belt signal;

wherein the seat switch and the belt switch include input terminals connected to the unswitched source of battery voltage, and switched output terminals;

a first transistor circuit connected to the switched output terminals and responsive to the seat belt signal and the seat switch signal;

a second transistor circuit connected to the first transistor circuit and including an output terminal;

an improper sequence warning device connected to the output terminal for providing an indication of improper sequence of seat switch and seat belt switch operation; and wherein the seat switch is connected by a time delay circuit to a grounded emitter transistor, the grounded emitter transistor having a collector connected to the base and collector of one of two series-connected transistors, wherein the base of the other series-connected transistor is connected to the seat belt switch, and wherein the series-connected transistors provide an enabling signal to the second transistor circuit only if the seat switch is closed prior to the closing of the seat belt switch.

15. The circuit as set forth in claim 14 wherein the seat switch is connected to the time delay circuit through a diode element having a voltage drop greater than the voltage drop across the series-connected transistors when the series-connected transistors are in the current saturated condition, the series-connected transistors connected to the time delay circuit to prevent the grounded-emitter transistor from turning on when the seat switch is open.

* * * * *